United States Patent [19]

Doan et al.

[11] Patent Number: 4,970,043

[45] Date of Patent: Nov. 13, 1990

[54] PROCESS FOR FORMING THERMOPLASTIC MATERIAL FROM GRANULAR SCRAP MATERIAL

[76] Inventors: Rosetta C. Doan, 4580 Beechnut, No. 110EC, Houston, Tex. 77096; Albert W. Mitchell, 11523 Willwood Dr., Houston, Tex. 77072

[21] Appl. No.: 316,595

[22] Filed: Feb. 27, 1989

Related U.S. Application Data

[63] Continuation of Ser. No. 183,363, Apr. 12, 1988, abandoned, which is a continuation of Ser. No. 851,264, Apr. 10, 1986, abandoned, which is a continuation of Ser. No. 452,107, Dec. 22, 1982, abandoned.

[51] Int. Cl.$^5$ ............................................. B29B 17/00
[52] U.S. Cl. ...................................... 264/237; 264/37; 264/328.16; 264/328.17; 264/349; 264/DIG. 69
[58] Field of Search ........................ 264/37, 121, 328.2, 264/328.16, 328.18, DIG. 69, 349, 328.17, 170, 300, 237; 138/96 T; 425/202, 205; 521/45.5; 525/95, 98

[56] References Cited

U.S. PATENT DOCUMENTS

| | | |
|---|---|---|
| 2,240,015 | 4/1941 | Pelk . |
| 2,437,538 | 3/1948 | Kelly . |
| 2,461,192 | 2/1949 | Banbury ............................. 521/45.5 |
| 2,723,934 | 11/1955 | Morris . |
| 2,809,944 | 10/1957 | Sverdrup ............................ 525/164 |
| 3,036,340 | 5/1962 | Waddell, Jr. ..................... 264/328.16 |
| 3,386,925 | 6/1968 | Dillhoefer . |
| 3,655,829 | 4/1972 | Ronzoni et al. ...................... 264/349 |
| 4,003,408 | 1/1977 | Turner ................................. 138/118 |
| 4,028,288 | 6/1977 | Turner ................................. 264/109 |
| 4,110,420 | 8/1978 | Turner ................................... 264/41 |
| 4,178,337 | 12/1979 | Hall et al. ........................... 264/349 |
| 4,290,470 | 9/1981 | Williams et al. ...................... 264/37 |
| 4,315,882 | 2/1982 | Hiratsuka et al. .................... 264/349 |
| 4,323,534 | 4/1982 | Des Marais ......................... 264/300 |
| 4,367,192 | 1/1983 | Arnason .............................. 264/300 |
| 4,379,471 | 4/1983 | Kuenzel ............................. 138/96 T |
| 4,481,335 | 11/1984 | Stark, Jr. ............................. 264/37 |

FOREIGN PATENT DOCUMENTS

| | | | |
|---|---|---|---|
| 53-134080 | 11/1978 | Japan ................................... 264/37 |
| 56-106939 | 8/1981 | Japan ................................... 264/37 |
| 690036 | 10/1979 | U.S.S.R. ............................... 264/37 |

OTHER PUBLICATIONS

Billmeyer, Text Book of Polymer Science (2nd Edition, 1971), pp. 492–498.
Bulletin from the Shell Chemical Company "SHell Kraton Rubber for Modification of Thermoplastics" No. SC:165–77 (Feb. 1977).

Primary Examiner—Jill L. Heitbrink
Attorney, Agent, or Firm—Browning, Bushman, Anderson & Brookhart

[57] ABSTRACT

A process forming a moldable material from a granular scrap material such as a high grade reground rubber and a thermoplastic polymer such as a butadiene-styrene block copolymer sold under the trademark Kraton-D-3202 by Shell Chemical Company. A substantially uniformly distributed mixture of the reground rubber and the cohesive base material in a ratio of at least about 1:1 is processed under sufficient pressure and temperature to form a semi-stable moldable product. The semi-stable moldable product is then subjected or maintained under sufficient pressure to form a stable moldable product. The ratio of reground rubber to cohesive base material may be 7:3 or higher, while pressure on the semi-stable product may generally be in the range of 1800 psi or higher. The moldable product may be subsequently molded, preferably with high fill velocities and maximum venting.

16 Claims, 2 Drawing Sheets

PROCESS FOR FORMING THERMOPLASTIC MATERIAL FROM GRANULAR SCRAP MATERIAL

This is a continuation of co-pending application Ser. No. 07/183,363 filed Apr. 12, 1988, which is a continuation of co-pending application Ser. No. 851,264 filed Apr. 10, 1986, which is a continuation of application Ser. No. 452,107, filed Dec. 22, 1982, all now abandoned.

BACKGROUND OF THE INVENTION

The present invention relates to a process for forming stable moldable and molded products and more particularly to a process and apparatus for forming stable moldable and molded products from a granular scrap material, such as reground rubber, and a cohesive base material, such as a thermoplastic rubber.

Plastics may be formed and subsequently molded into useful articles by a variety of methods. For example, in extrusion processes, a polymer may be propelled continuously along a screw through varying regions of high temperature and pressure such that the polymer is melted and compacted and finally forced through a die shaped to give the final object. The molding of thermoplastic materials may likewise be accomplished by a number of devices and methods, including injection molding. In an injection molding process the polymer is generally preheated in a cylindrical chamber to a temperature at which it will flow and then forced into a relatively cold closed mold cavity by means of high pressures applied through a plunger. A reciprocating screw may be employed to deliver the feed to the mold. A brief description of these processes may be found in Billmeyer, Text Book of Polymer Science (2d Edition, 1971), pp. 492–498.

Extruders have been employed to form plastic compound, including various kinds of recycled rubber. For example, U.S. Pat. Nos. 4,003,408 and 4,110,420, issued to James E. Turner describe an apparatus including an extruder to form a porous pipe made primarily of rubber and synthetic rubber reclaimed from rubber tires. U.S. Pat. No. 3,386,925 issued to Dillhoefer makes reference to injection molding and extruding of a thermoplastic rubber blend comprising reclaimed rubber, and U.S. Pat. No. 2,809,944 issued to Sverdrup makes reference to the use of a screw impeller in processing a reclaimed rubber by joint working and admixture of a vulcanized rubber scrap and a thermosetting phenolformaldehyde resin at a temperature within the rubber-reclaiming range.

The patent literature discloses a variety of processes which attempt to process a reclaimed rubber. For example, U.S. Pat. No. 4,028,288 issued to James E. Turner discloses a heat and pressure molded end product made of a mixture of particalized rubber tires and a lesser amount of a synthetic resin thermoplastic material. The porosity of the molded end product is controlled by the amount of rubber material bits mixed in the precursor material. Thus, it is stated that a 50-50 rubber-plastic mixture results in an end product with very little porosity, while an 80-20 rubber-plastic mixture results in a very porous end product.

U.S. Pat. Nos. 4,110,420 and 4,003,408, also issued to James E. Turner, disclose a method and pipe product made primarily of rubber and synthetic rubber reclaimed from rubber tires. The rubber and synthetic rubber are ground to a relatively small size, and process mixed through a pipe extruder with a smaller amount of a binder mix of primarily polyethylene, along with vinyl, ABS binder, and a trace of attaclay. A porous pipe said to be useful in underground irrigation is formed.

U.S. Pat. No. 3,386,925 issued to Dillhoefer discloses a blend which may be formed by injection molded extrusion and other processes. The blend is made of a copolymer of ethylene and vinyl acetate containing from 12 to 25 weight percent based on the copolymer of vinyl acetate and a reclaimed rubber with certain characteristics. The copolymer is present in a concentration of 20–85 weight percent based on the blend. Reclaimed rubber is defined as the depolymerization product of vulcanized comminuted rubber which retains at least in part the cross links imparted by the vulcanization process of the original rubber.

Other patents disclose reclaimed rubber compositions, such as U.S. Pat. No. 2,437,538 or processes for reprocessing reclaimed vulcanized rubber, such as U.S. Pat. No. 2,809,944, wherein there is disclosed a process for forming certain products from vulcanized rubber scrap, such as scrap from tires and a thermosetting phenolformaldehyde resin by mixing the resin with the vulcanized rubber and reclaiming the rubber by plasticizing the materials in admixture by a joint working at a temperature within the rubber-reclaiming range followed by subsequent curing under vulcanizing conditions. The plastic may be in the range of from 5 to 15% of the vulcanized rubber product.

A variety of other processes have been disclosed utilizing old rubber particles. For example, U.S. Pat. No. 2,240,015 discloses a process whereby a dispersed emulsion of old rubber particles is sprayed on a surface and then baked. Similarly, in U.S. Pat. No. 2,723,934 there is disclosed a porous rubber material made from vulcanized rubber with an adhesive reinforcing substance added in the interstices of the rubber.

There is a reference in the advertising literature to using copolymers for upgrading recycled and scrap material. More particularly, in a technical bulletin from the Shell Chemical Company entitled "Shell Kraton ® Rubber for Modification of Thermoplastics," No. SC:165-77 (February 1977) it is stated that Kraton rubbers may be used for general upgrading of recycled and scrap material.

These and other prior processes have suffered from one or more defects and limitations. For example, the percentage of scrap rubber which may be employed is often limited depending upon the properties of the end product. For example, plastics formed from a mixture of recycled rubber having more than 50% by weight recycled rubber have generally not had uniform properties. Additionally, various processes using recycled materials result in products having other unacceptable properties. These and other limitations and defects are substantially minimized if not eliminated by the present inventive process and method.

SUMMARY OF THE INVENTION

In accordance with the present invention there is provided a process for forming a stable moldable product from a granular scrap material comprising a reground rubber and a cohesive base material, such as a thermoplastic rubber. The ratio of the scrap material to cohesive base material is preferably at least 1:1 or higher. For example, the percentage by weight of reground rubber might be 70%, while the cohesive base material might be 30% or less. Generally, the granular scrap material and the cohesive base material are mixed under sufficient pressure and temperature for a sufficient residence time to at least partially plasticize some portion of the materials and form a semi-stable moldable product believed to have an aggregate interior portion at least partially encapsulated by an outer cover layer. Process conditions are such as to avoid significant degradation of any of the materials. The semi-stable moldable product is maintained under a sufficiently high pressure while being at least partially cooled to allow the outer cover layer to strengthen and form a stable moldable product. The stable moldable product may then be heated sufficiently to form a plasticized moldable material while under sufficient pressure to avoid significant deterioration of the plasticized moldable material. The plasticized moldable material may then be molded, for example, by injecting the plasticized material into a mold at a sufficiently high velocity to avoid significant localized cooling. The plasticized moldable material is partially cooled in the mold while under pressure.

The ratio of granular scrap material to the cohesive base material may vary over a wide range. For example, a starting material comprising a high grade reground rubber and the cohesive base material may be comprised of at least 70% by weight of the reground rubber. It is believed that the granular scrap material may comprise up to 90% or more of the starting material.

A wide variety of starting materials may be employed. For example, the granular scrap material may comprise a reground rubber. It is believed that the granular scrap material may also comprise a wide variety of other substances, including ground thermoset elastomers. However, where reground rubber tires are used, it is believed to be preferable to employ a high grade reground rubber such as truck peels or airplane peels as opposed to reground automobile tires which tend to have a greater amount of debris. The cohesive base material may comprise a thermoplastic polymer such as a thermoplastic rubber like a thermoplastic block copolymer of styrene and butadiene. It is believed that olefins such as polyethylene or polyvinyl chloride may also be employed.

The process conditions may be varied, but sufficient pressure on the semi-stable moldable product must be maintained until a stable moldable product is formed. Depending upon the percentage of granular scrap material employed, pressures may range from less than 500 psi to 1800 psi or higher. Processing temperatures may likewise vary over a range, which is generally within 350° to 500° F. or higher.

The process for forming a stable moldable product may include the steps of feeding a granular scrap material and a cohesive base material in predetermined quantities without substantial premixing to a feed zone for mixing to form a uniformly distributed mixture. The mixture is then compressed and heated for a sufficient time to form a plastic stream. The plastic stream is then passed under sufficient temperature and pressure through a metering zone until a semi-stable moldable product is formed. The semi-stable product is then maintained under sufficiently high pressure while at least partially cooling the semistable product to form a stable moldable product. The moldable product may be subsequently reheated under pressure and other process conditions sufficient to avoid the destabilization of the stable moldable product to form a molded product.

In another embodiment there is provided a process for forming a stable moldable product including the steps of feeding high grade reground rubber and thermoplastic rubber comprising a styrene-butadiene block copolymer in a ratio of at least 7:3 by weight of reground rubber to thermoplastic rubber to a feeding zone to form a uniformly distributed mixture, while applying heat to the materials as the materials are fed and mixed. The mixture is then compressed at a pressure in the range of 1100 to 1800 psig or higher, while the mixture is heated to a temperature in the range of 350°–380° F. for a sufficient time to form a semi-stable moldable product. The semi-stable moldable product is maintained at a temperature in the range of 380°–410° F. and under a pressure in excess of about 1800 psig. The semi-stable moldable product is then at least partially cooled under a pressure in excess of about 1800 psig for at least one-half of its cooling cycle to form a stable moldable product.

There may also be provided an apparatus for forming a stable moldable product. There is provided a feed zone configured to mix the granular scrap material and the cohesive base material to form a mixture. A compression zone is in fluid communication with the feed zone and configured to receive and apply pressure to the mixture. A heat source is in heat exchange relation with the feed zone and the compression zone. The heat source is configured to supply added heat to the mixture sufficient to cause the formation of a plastic stream. A metering zone is also provided. The metering zone is in fluid communication with the compression zone in a heat exchange relation with the heat source. The metering zone is configured to form a semi-stable moldable product. A pressure maintenance zone is in fluid communication with the metering zone. The pressure maintenance zone is configured to maintain the semi-stable product under sufficient pressure. A cooling source is in heat exchange relation with the pressure maintenance zone. The cooling source is configured along with the pressure maintenance zone to remove a sufficient amount of heat from the pressure maintenance zone to form a stable moldable product.

The apparatus may further include a pressurized plasticizing zone configured to receive the stable moldable product from the pressure maintenance zone. The plasticizing zone is in heat exchange relation with the heat source and is configured to apply sufficient heat and pressure to plasticize the stable moldable product and form a replasticized semi-stable product. A high velocity injection zone is connected to the pressurized plasticizing zone and configured to inject the semi-stable product into a pressurized mold. The mold is vented to the maximum extent possible. The mold is in heat exchange relation with a cooling source.

In a more detailed embodiment there is provided an apparatus for forming a stable moldable product including a screw extruder. The screw extruder includes a barrel housing with a length to diameter ratio within the range of about 30:1 to 40:1. The barrel housing has a screw rotatably mounted therein. The screw has three sections of flights. The first section is a feed section. The second section is a compression section having a length of about 5 to 8 housing diameters, while the third section is a metering section having a length of at least about 10 housing diameters. The compression ratio between the feed section and the metering section is within the range of about 3:1 to 5:1. A motor is coupled to the screw. The motor has sufficient power to turn the screw at greater than 200 revolutions per minute under process conditions. A die is coupled to the extruder and in fluid communication with the metering section of the extruder. The die is adapted to maintain a pressure of at least 1200 psig or more on any material in the die. A pressurized cooling tank is provided. The tank is in fluid communication with the die and is configured to receive a semi-stable moldable product under sufficient pressure to ensure the formation of a stable moldable product.

In another embodiment the apparatus for forming a stable moldable product further includes an injection molding device in communication with the pressurized cooling tank. The pressurized tank is configured to receive the stable moldable product. The molding device has a mold cavity configured for maximum venting. For example, the mold cavity may have a length of less than about 0.050 inches and a trough of greater than about 020×0.375 inches.

There follows a detailed description of a preferred embodiment of the present inventive apparatus and method in conjunction with the foregoing drawings. This description is to be taken by way of illustration rather than limitation.

DETAILED DESCRIPTION

Figure 1:
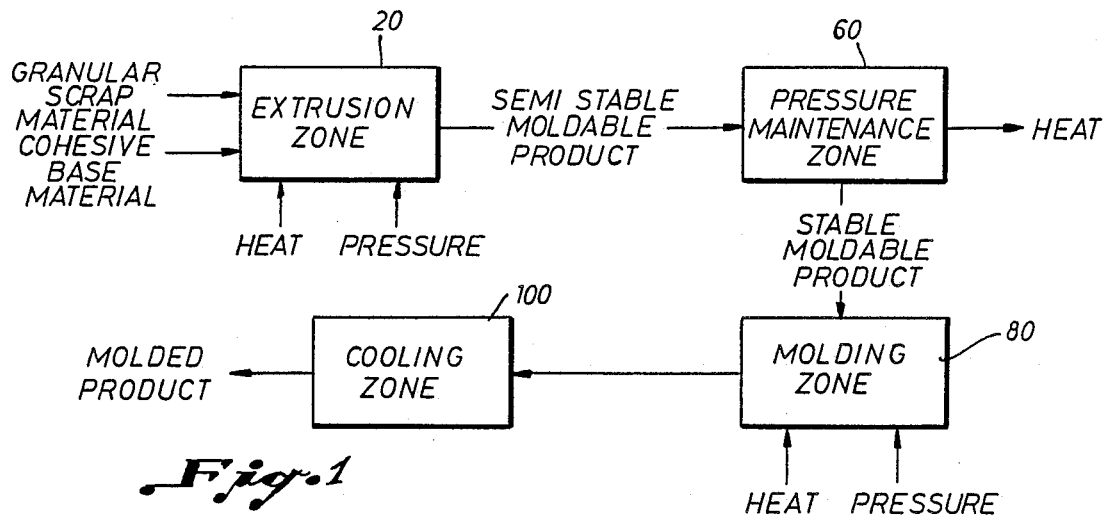
FIG. 1 is a flow chart depicting one embodiment of the present invention.

Referring generally to FIG. 1 there is shown a schematic outline of one embodiment of the present invention. Referring generally to that figure a granular scrap material such as a high grade reground rubber and a cohesive base material are fed to an extrusion zone 20. The granular scrap material and the cohesive base material are subjected to sufficient pressure and temperature for a sufficient residence time to form a semi-stable moldable product believed to have an aggregate interior portion at least partially encapsulated by an outer cover layer. The semi-stable moldable product then passes to a pressure maintenance zone 60 where the semi-stable moldable product is maintained under a sufficiently high pressure while being at least partially cooled thus resulting in the formation of a stable moldable product, apparently since the outer cover layer is allowed to strengthen. The stable moldable product may be treated as an end product of the process. Alternately, the stable moldable product may be ultimately passed to a molding zone 80. In the molding zone 80, the stable moldable product is heated sufficiently to form a plasticized moldable material under sufficient pressure to avoid significant deterioration of the plasticized moldable material. The plasticized moldable material is then injected into a mold at a sufficiently high velocity to avoid significant localized cooling. The plasticized moldable material is then subsequently at least partially cooled in the mold while sufficient pressure is maintained to avoid significant deterioration of the material. The resulting material is then passed to cooling zone 100 where the material undergoes further cooling to the extent required to form a molded product.

The ratio of the granular scrap material to the cohesive base material may vary over a wide range depending upon the ultimate characteristics desired in the moldable product and the molded product. For example, the ratio of the granular scrap material to the cohesive base material may be in the range of 7:3 to 9:1 or higher and still result in a product having proper conformation and integrity and relatively low porosity. The type of materials employed may also be varied. For example, the granular scrap material may be a high grade reground rubber, while the cohesive base material may be a thermoplastic polymer such as a styrene-butadiene block copolymer. However, where a reground rubber is used it is believed preferable for the granular scrap material to be a high grade rubber, such as that used in airplane and truck tires having reduced debris as compared to reground rubber obtained from many automobile tires.

Pressures and temperatures may also vary over a significant range, though pressures and temperatures must be such as to sufficiently promote the formation of a stable moldable product and prevent the significant deterioration of the semi-stable moldable product when a moldable or molded product is formed. The process conditions, such as pressure and temperature, may be obtained by a variety of methods. By way of example, a substantial portion of the pressure or heat required in the extrusion zone may be obtained by mechanical means such as through the use of an appropriately constructed extruder as shall hereinafter be more fully described.

Figure 2:
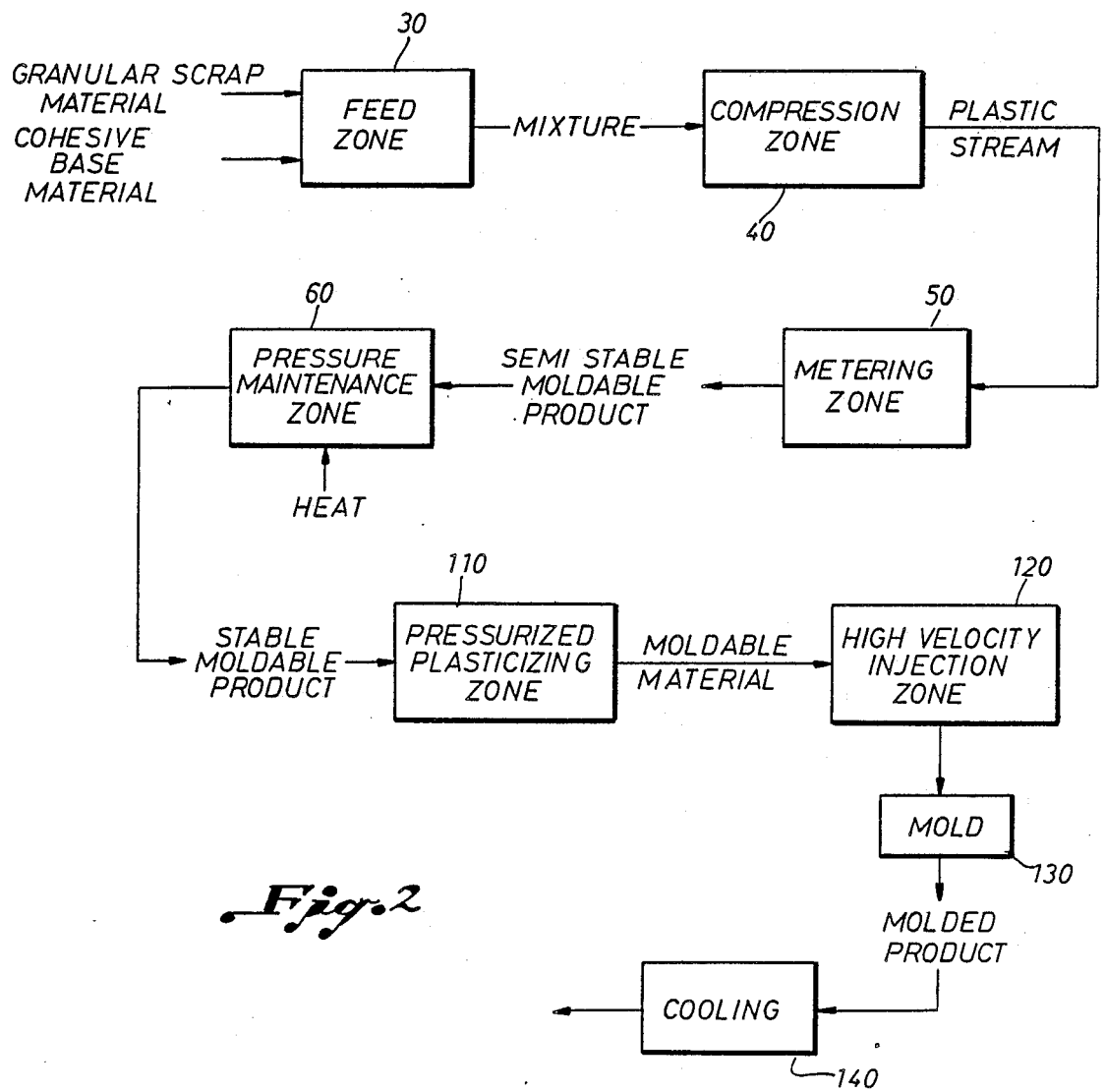
FIG. 2 is another flow chart depicting an embodiment of the present invention.

A schematic of another embodiment of the process is shown in FIG. 2. A granular scrap material and a cohesive base material are fed in predetermined quantities without substantial premixing to a feed zone 30 to form a substantially uniformly distributed mixture. The mixture is then compressed and heated in a compression zone 40 for a sufficient time to form a plastic stream. The plastic stream is then passed through a metering zone 50 under sufficient temperature and pressure until a semi-stable moldable product is formed.

The semi-stable moldable product is maintained under a sufficiently high pressure in a pressure maintenance zone 60 while the semi-stable moldable product is at least partially cooled sufficiently to form a stable moldable product. The stable moldable product may then be treated as a final product of the process. Alternately, the stable moldable product may be ultimately fed to a pressurized plasticizing zone 110 where the stable moldable product is heated sufficiently to form a replasticized semi-stable moldable material while under sufficient pressure to avoid significant deterioration of the material. The replasticized semi-stable moldable material is then passed to a high velocity injection zone 120 and injected into a mold 130 at a sufficiently high velocity to avoid significant localized cooling. The replasticized semi-stable moldable material is then at least partially cooled within the mold 130 while the pressure is maintained on the material at a sufficient level to avoid significant deterioration of the material. The resulting molded product may then be subsequently cooled in a cooling zone 140.

Figure 3:
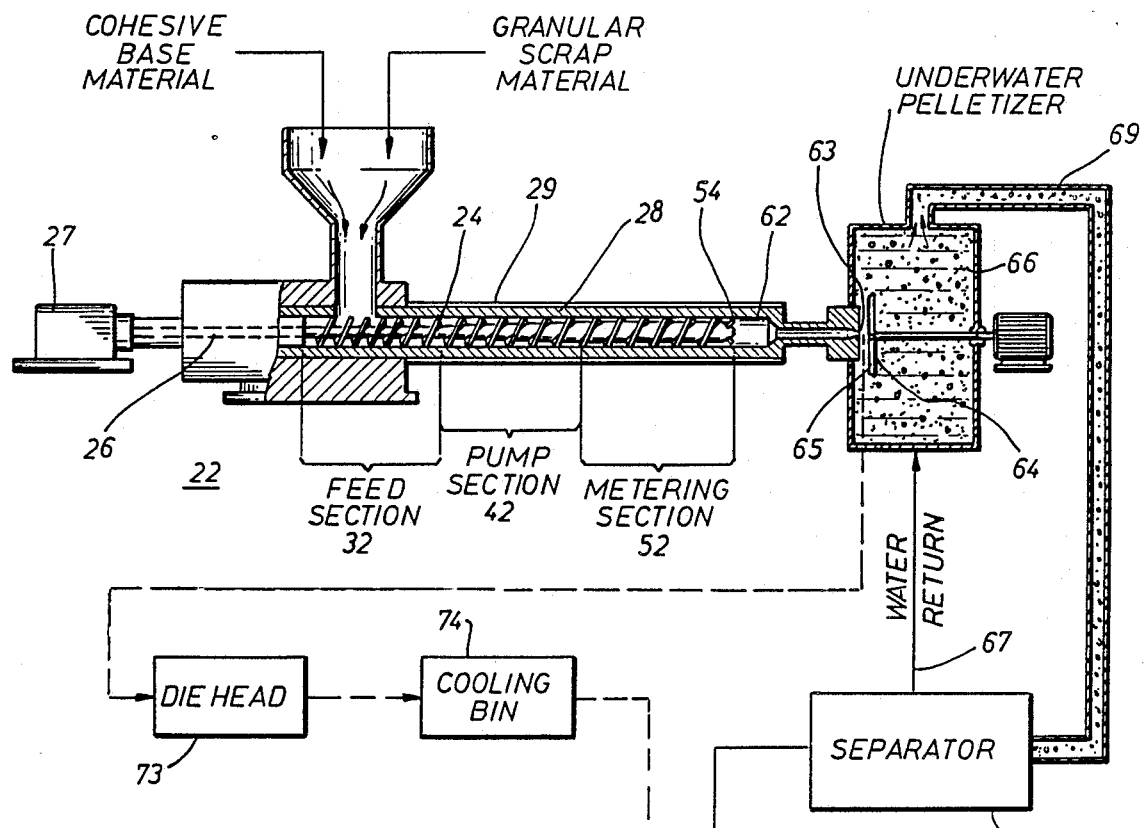
FIG. 3 is a schematic view of another embodiment of the present invention.

Referring now more particularly to FIG. 3 as well as FIGS. 1 and 2, each zone will now be described in more detail with respect to a particular embodiment.

Extrusion Zone

The extrusion zone 20 as depicted in FIG. 1 may be thought of as comprising a feed zone 30, a compression zone 40 and a metering zone 50 as shown in FIG. 2. In a more particular embodiment as shown in FIG. 3 these three zones may respectively be feed section 32, the pump section 42 and the metering section 52 of extruder 22. Each of these zones will be discussed in turn.

Feed Zone

A granular scrap material and a cohesive base material in a predetermined ratio are fed to feed zone 30 for mixing. Additionally, depending on process conditions, such as temperature, some initial melting may occur in the feed zone.

The cohesive base material and the granular scrap material may be any one of a number of substances. The cohesive base material may generally be any thermoplastic or thermoformed polymer including rigid or elastic thermoformed polymers. By way of example, the cohesive base material may be a butadiene-styrene copolymer such as a thermoplastic block copolymer of styrene and butadiene sold under the trademark Kraton-D-3202 by the Polymers Division of Shell Chemical Company. It is believed that olefinic polymers such as polyethylene may also be used. Similarly, it is believed that polyvinyl chloride may also be used if appropriate temperatures are attainable.

The granular scrap material includes a reground rubber. It is also believed that a wide variety of other thermoset elastomers may be employed, at least presuming that the beneficial effects obtained in practicing the present invention are not due to a specific chemical change such as through a particular catalyzed reaction. Although not wishing to be held to any particular theory it is believed that the proper processing of the granular scrap material and the cohesive base material as disclosed herein results initially in the formation of a semi-stable moldable product having an aggregate interior portion at least partially, if not completely, encapsulated by an outer cover layer. As the outer cover layer or skin is completed and solidifies or strengthens through cooling under pressure and other appropriate process conditions as disclosed herein it is believed that the outer cover layer is sufficiently strengthened to form a stable moldable product. It is believed that this may be a result of the cohesive base material coming to the surface or outer regions of each batch of the moldable or molded product.

However, this may also be due in whole or in part to a chemical reaction occurring under the process conditions disclosed herein. For example, it may be possible that the cohesive base material is reacting with some portion of the granular scrap material or otherwise catalyzing the transformation of the granular scrap material. If this is the case then it is believed that the granular scrap material may have to at least partially comprise a reground rubber and for the cohesive base material to comprise a butadiene-styrene block copolymer. The presence of certain additional materials or substances may be required.

The size of the materials being fed to the feed zone 30 may vary. However, it is generally preferable to reduce the particulate size of the materials to promote uniform distribution, mixing, and combination to form the semi-stable and stable moldable products under the process conditions in the system. By way of example, if a reground rubber is employed the particle sizes should generally not be greater than $\frac{1}{8}$th of an inch and are preferably smaller. By way of example, the granular scrap material and the cohesive base material may each be in the range of 20 to 40 mesh.

In some instances it may be preferable to dry the feed materials to reduce their moisture content, since it is possible that a longer residence time may be required if there is too much moisture in the materials entering the feed zone. By way of example, it may be preferable to have a material moisture content of less than 0.2% by weight. However, it is believed that the moisture content will generally not work a change in the intrinsic viscosity or in the properties of the final product. Additionally, if the moisture content of the materials entering the feed zone is sufficient to affect the final product, then it may be desirable to modify certain process conditions. For example, it may be preferable in some instances to use a vented extruder.

It is also believed at least preferable, if not necessary, to use a high grade reground rubber which has a reduced debris content as a granular scrap material. For example, a reground rubber made from truck and bus peels and substantially free of foreign fabric and material may be employed.

Process conditions in the feed zone will generally not vary significantly with the composition of the materials being fed to the feed zone. However, the process conditions in and the configuration of the feed zone should be such as to provide an adequate distribution of the cohesive base material and the granular scrap material. Additionally, process conditions may be varied depending upon process requirements in subsequent zones. For example, as the percentage of granular scrap material increases, it is believed preferable to increase the temperature of the feed zone. Additionally, where the feed zone comprises a feed section 32 of an extruder 22 the size and configuration of the feed zone may be set in relation to the size of other sections such as the metering section 52 to provide appropriate increases in pressure and temperature.

Compression Zone

Once the granular scrap material and the cohesive base material have been formed into a mixture in feed zone 30 they are passed to compression zone 40 where they are formed into a plastic stream under pressure and heat. Although not wishing to be restricted to any particular theory it is believed that this plastic stream may be a type of slurry with the granular material suspended in the cohesive base material.

The pressure and heat may be supplied totally from an external source. Alternately, a portion of the heat and pressure may be produced by the interaction of the apparatus with the mixture passing from the feed zone 20. For example, in extruder 22 the increase in pressure is caused by the arrangement of the flights 24 on shaft 26 and the size and configuration of the housing such as barrel housing 28. Additionally, much of the heat is generated by friction. However, in most cases where an extruder 22 is employed an external heat source such as heat jacket 29 will supply additional heat as necessary to the compression zone.

As with the feed zone 30, the configuration of and process conditions in the compression zone 40 may be varied depending upon the materials being processed and the configuration of the feed zone 30, metering zone 50 and other zones of the process. By way of example, if an extruder 22 is employed and compression zone 40 comprises a pump or transition section 42 of extruder 22, then the length of the pump section and the overall configuration of the flights 24 in the pump section 42 may be appropriately varied to ensure the proper formation of a plastic stream.

Metering Zone

The plastic stream formed in compression zone 40 passes through metering zone 50 to form a semi-stable moldable product. As with the other zones the configuration of the metering zone may be varied depending upon process materials and conditions as would be known to one skilled in the art having the benefit of this disclosure. For example, if extrusion zone 20 is comprised of extruder 22 and the pressure is at least partially controlled by the difference in the structure of the flights 24, then the compression ratio between section 32 and the metering section 52 should preferably be within the range of 3:1 to 5:1. Additionally, in the case of the screw extruder 22 as shown in FIG. 3 the length to diameter ratio of the barrel housing is preferably within the range of about 30 to 1 to about 40 to 1, while the pump section 42 preferably has a length of about 5 to 8 housing diameters and the length of the metering section 52 is preferably at least about 10 housing diameters. Additionally, the motor 27 which is coupled to shaft 26 preferably has sufficient power to turn the screw at a speed of about 200 revolutions per minute or greater under the process conditions in the extruder 22.

The process conditions within the extrusion zone 20 may be varied depending upon the makeup of the material supplied to the feed zone 30. By way of example, if a reground rubber and a thermoplastic block copolymer of styrene and butadiene are used as the granular scrap material and the cohesive base material respectively, then process condition will be varied depending upon the relative percentages of the materials. However, it is necessary to attain sufficient pressure and temperature in the extrusion zone to ensure that the pressure in the pressure maintenance zone is sufficiently high to induce or provide for the formation of a stable moldable product. For example, where a high grade reground rubber is fed in a 50:50 ratio with the thermoplastic block copolymer the compression ratio of extruder 22 may be 3 to 1 or less with pressures increasing to 500 psi or less and overall temperatures falling within the range of 280°-320° F. However, where the reground rubber to thermoplastic block copolymer ratio is in the range of 60:40, ultimate pressures should be greater than 800 psi and preferably in the range of 1100 to 1200 psi or higher and temperatures should be greater than 330° F. and generally within the range of 330° to 350° F. along the extrusion zone. Where the ratio of reground rubber to the copolymer is 70 to 30 or greater then the pressure should generally be increased to a pressure greater than 1200 psi and preferably as high as 1800 to 2000 psi or higher if good conformation of the product is to be obtained. Additionally, the temperature should generally be in the range of 350° to 400° F. along the extrusion zone. These varying pressures and temperatures may at least in part be obtained by the proper configuration of the various zones as is the case with the extruder 22 shown in FIG. 3 as indicated above.

As would be known to one skilled in the art having the benefit of this disclosure the overall configuration of the extrusion zone 20 may be varied to attain the appropriate process conditions. By way of example, a vented extruder could be employed to allow more volatile substances to escape. Additionally, feed zone 30 and compression zone 40 may be encompassed into one unit, such as an intensive mixer. By way of example, a Banbury intensive mixer might be employed to produce a plastic stream for passage through a metering zone 50.

The metering section 52 may be equipped with mixing pins 54 to further promote mixing and maintain uniform distribution. For example, if pressure can be maintained, then the use of mixing pins or the like may allow reduction in screw speed below 200 rpms where an extruder is employed to handle a 70:30 mixture by weight of reground rubber and a styrene butadiene copolymer. By way of example, the screw speed could be reduced to 150 rpms depending upon the overall configuration of the extrusion zone. To this end a variety of mixing pins may be employed. For example, visbreaking pins such as dalmige pins may be employed in the metering section 52.

Pressure Maintenance Zone

The semi-stable moldable product passing to pressure maintenance zone 60 must be subject to a sufficiently high pressure in order to prevent the degradation of the semi-stable moldable product for a sufficient time to allow the formation of a stable moldable product. As with the extrusion zone 20 the pressure required will vary depending upon other process conditions including the severity of any reductions in temperature and the makeup of the original materials passed to the feeding zone 30. For example, where a 70:30 mixture of a high grade reground rubber and a styrene-butadiene block copolymer, such as that sold by Shell Chemical Co. under the trademark Kraton-D-3202, is employed, the pressure in the pressure maintenance zone should generally be in the range of 1800 psi or higher with initial temperatures preferably in the range of 380° to 410° F. Pressures in the range of 1900 psi to 2800 psi and higher with temperatures in the range of about 400° F. to 490° F. have also been employed with success on a 75:25 mixture of reground truck peel and Kraton-D-3202.

The pressure maintenance zone 60 may take on a number of configurations. By way of example, it may comprise a transition zone 62 of extruder 22. To this end the exit orifice from the transition zone should be of appropriate size to allow maintenance of the appropriate pressure for a sufficient time to allow a moldable material to form. To this end it may be generally preferable to avoid the use of a dispersion plug or gate to enhance any back pressure where the use of such a plug or gate would materially reduce the protion of the transition section of the extruder which functions as a pressure maintenance zone. However, the extent of the pressure maintenance zone may be modified to some extent where the material is rapidly cooled upon exiting the pressure maintenance zone. By way of example, as shown in FIG. 3 there could be used an underwater pellitizer in direct communication with the exit 63 of extruder 22. The pellitizer could include a bath 66 with an impeller mechanism 64 having a plurality of knives 65 for shearing off discrete segments of the material leaving extruder 22. Water or other appropriate coolant could be pumped in via line 67 and a cooled pellitized moldable product along with the coolant could be removed via line 69 for recovery in separator 71, all as would be known to one skilled in the art having the benefit of this disclosure. Alternately, as also shown in FIG. 3, where a separate die head such as die head 73 is employed, the partially cooled stable moldable product may be passed directly to the die head and then to a cooling bin such as cooling bin 74. However, the pressure on the material in the pressure maintenance zone must not be reduced until the semi-stable moldable product is transformed into a stable moldable product. Thus, the semistable moldable product could not generally be passed from the extrusion zone 20 and allowed to cool slowly for any length of time in air prior to passing to a reduced pressure area such as a cooling bath opened to the atmosphere.

Molding Zone

The stable moldable product leaving the pressure maintenance zone 70 may be treated as the final product of the system. Alternately, it may be passed almost immediately or at a substantial time later to the molding zone 80. In either case the moldable product may be in a pellitized form, though it may be preferable to remove moisture or other coolant from the pellets where a pelletized is used.

As shown in FIG. 2 the molding zone 80 may be thought of as comprising a pressurized plasticizing zone 110, a high velocity injection zone 120 and a mold 130. Generally, the stable moldable product is heated under pressure in the pressurized plasticizing zone 110 to form a plasticized moldable material. The pressure should be sufficiently high to avoid degradation of the plasticized moldable material. By way of example, the pressure may be in the range of 200 to 800 psi. Alternately, it may be greater than 800 psi, generally depending at least in part upon the method used to inject the material into the mold. The plasticized moldable material is then passed to high velocity injection zone 120 which serves to inject the plasticized moldable material at sufficiently high velocity into mold 130 to avoid significant localized cooling.

The pressurized plasticizing zone 110 and the high velocity injection zone 120 may be incorporated within the same apparatus as is the case with an injection molding device whether of the plunger type or of the reciprocating-screw type. For example, as shown in FIG. 3 the stable moldable product may be placed into feed hopper 108 and passed in discrete predetermined quantities into cylindrical chamber 116 where it is preheated to an appropriate temperature and under appropriate pressure to form a plasticized moldable material by heating and mixing by screw 112. An external source of heat may also be supplied if appropriate, as would be known to one skilled in the art having the benefit of this disclosure. The screw 112 rotates, forcing the plasticized moldable material forward against a valve 114. The screw 112 moves backwards in the cylindrical chamber 116, until enough material to fill the mold has been processed. Valve 114 is then opened and the screw 112 is then pushed forward by means of plunger 122 to fill the mold 132.

As indicated, the fill velocity should be sufficiently high to avoid significant localized cooling in the mold. By way of example, the fill velocity must generally be greater than 3 inches per second for most injection molding devices. It may be necessary to have higher fill velocity, such as 4½ inches per second depending upon a variety of factors such as the thickness of the wall sections of the molded product formed in the mold 130, as would be known to one skilled in the art having the benefit of this disclosure.

Conditions in the pressurized plasticizing zone and the high velocity injection zone should be such as to ensure that sufficiently high pressures are attained in the mold. The pressure in the mold should be greater than 800 psi and should preferably be higher depending upon the configuration of the molded product, the mold and the percentage of granular scrap material originally supplied. By way of example, if a 70:30 mixture is passed to the feed zone to form the stable moldable product, then the pressure is preferably in the range of 1100 to 1200 psi and higher. For example, the pressure may be 1800–2000 psi.

Venting and cooling of the mold are generally particularly important to promote molding efficiency and result in a molded product having the appropriate conformation and other properties. Given the high velocity with which the material is injected into the mold, maximum venting is generally required, apparently due to the presence of air in the mold cavity. By way of example, referring to FIG. 4, which shows a schematic view of a mold for a thread protector, the land area 133 of the mold 132 must generally be less than 0.05 inches with a trough cross-sectional area 135 of greater than $0.02 \times 0.375$ inches. If the venting is insufficient and any resulting gases do not escape, then the molded product may not be properly formed. Alternately, by way of example, vent and land areas may be varied through use of partially evacuated mold cavities.

Figure 4:
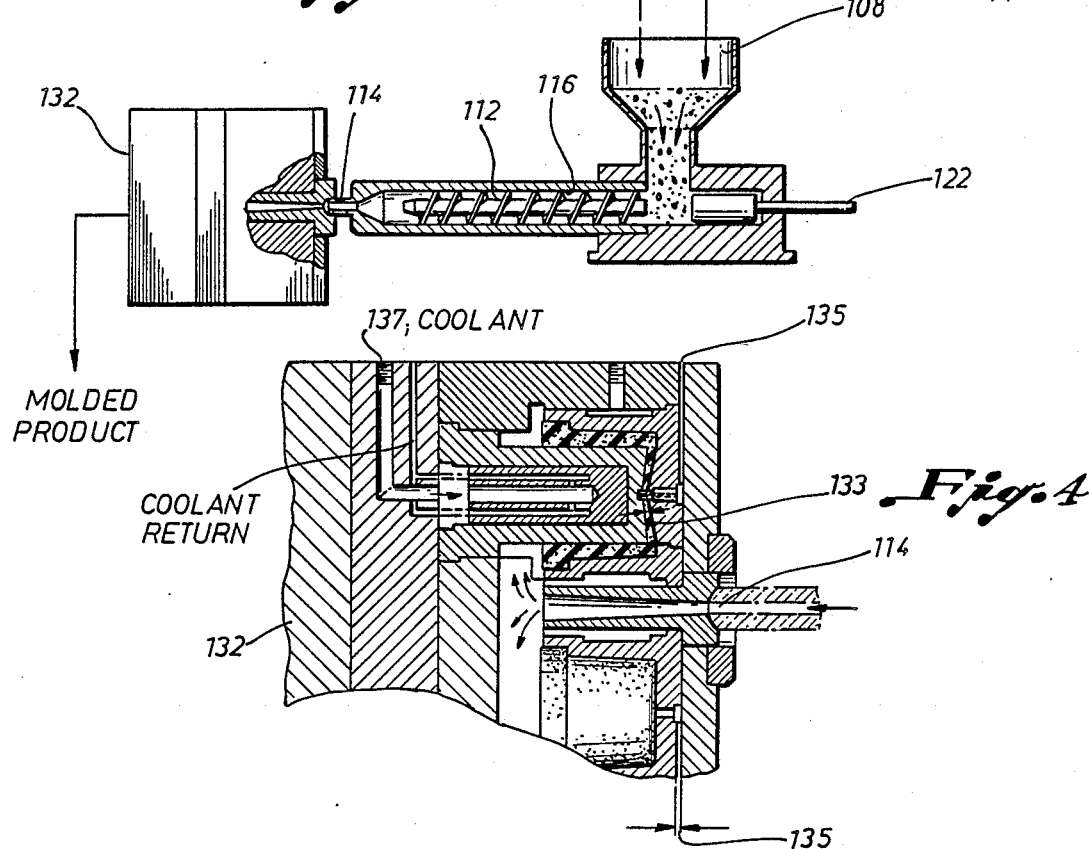
FIG. 4 is a schematic view of a portion of one aspect of the embodiment shown in FIG. 3.

The coolant supplied to the mold, such as by conduit 137 as shown in FIG. 4, should generally be within a specified temperature range. This is believed due to the fact that if the temperature is too low within the mold that the skin or outer covering will reform too quickly or not reform at all. However, temperatures should not be so low as to substantially reduce the efficiency of the mold due to increased time for processing each molded product. By way of example, if water is supplied as a coolant to the mold 132 then the temperature of the coolant entering the mold should preferably be greater than 65° F. but less than 80° F. and most preferably between 70° F. and 75° F.

A variety of variations in the foregoing may be possible. For example, the extrusion zone 20 may be operated in an oxygen-free atmosphere to minimize degradation. Alternately, a nitrogen blanket may be employed. Additionally, the pressure in the metering zone such as metering section 52 may be approximately the same as the pressure in the pressure maintenance zone such as transition zone 62. However, pressure in the pressure maintenance zone may be significantly greater than the pressure in the metering zone. In such a case an appropriate device, such as a check valve, may be employed between the two zones. Furthermore, although a specific mold is shown in FIGS. 3 and 4, the configuration of the mold may be varied as would be known to one skilled in the art having the benefit of this disclosure.

The following examples are provided by way of further illustration rather than limitation.

EXAMPLES

Example 1

An apparatus substantially as shown in FIG. 3 was employed to process a high grade reground rubber made up of No. 1 truck and bus peels free of fabric and foreign material and ground through a 30 mesh screen. The reground rubber had the approximate specifications shown in Table 1. The material was typically packaged in 15½"×6"×36" tri-wall Kraft bags which were sewn shut. Packaging typically complied with D.O.T. Specification No. 44-E. The reground rubber was supplied by Baker Rubber Inc. of Southbend, Ind.

TABLE 1

CHEMICAL SPECIFICATIONS
Truck Tread Rubber

|  | MIN. |  | MAX. |
|---|---|---|---|
| Acetone Extract | 14.0% | — | 17.0% |
| Ash Content |  |  | 7.0% |
| Carbon Black | 29.0% | — | 33.0% |
| Moisture |  |  | 0.75% |
| Natural Rubber | 22.0% |  |  |
| Rubber Hydrocarbon (RHC) | 45.0% |  |  |
| Specific Gravity (Nominal) |  | 1.15 |  |

SIEVE ANALYSIS SPECIFICATION: (ASTM Spec. E-11-70)

| MESH | NOMINAL OPENING | % RETAINED |
|---|---|---|
| 20 | .0331 | 0.0% Max. |
| 30 | .0234 | 5.0% Max. |
| 40 | .0165 | 25.0% Min. |

A thermoplastic block copolymer of styrene and butadiene produced by the Polymers Division of Shell Chemical Company under the trademark Kraton-D-3202 was used as the cohesive base material. The material was supplied in pellet form. It has a specific gravity of 1.01.

It is believed that typical physical properties of injection molded specimens of Kraton-D-3202 are set forth in Table 2. The injection molding was accomplished in a Fellows 3-125 Ram-Type injection molding machine with a cylinder temperature of 375° F., a mold temperature of 80° F. and injection pressure of 800 psig, all as disclosed in a Shell Chemical Company bulletin entitled Kraton 3202, Thermoplastic Rubber for Kraton 3202.

The ratio by weight of the reground rubber to Kraton 3202 was approximately 7:3. However, the actual percentages of the material may be somewhat different than shown in this example due to an incomplete purge of the extruder.

TABLE 2

| INJECTION MOLDED PROPERTIES (ASTM D412-62T) | FLOW DIRECTION | |
|---|---|---|
| | Parallel | Normal |
| Tensile Strength, psi | 775 | 875 |
| Elongation, % | 275 | 525 |
| 100% Modulus, psi | 630 | 375 |
| 300% Modulus, psi |  | 650 |
| Hardness, Shore A | 67 | |
| Set @ break, % | 10 | 30 |
| Tension Set,[1] % | 13 | 25 |
| Tear Resistance, (ASTM D642-54) | | |
| Die B, Nickel Crescent, pli | 200 | 200 |
| Die C, Angle, pli | 195 | 235 |

[1]Set @ 50% of Ultimate Elongation

The resulting pelletized moldable product was tested and found to have the approximate characteristics shown in Table 3. It is believed that subsequently molded products have approximately the same melt temperature, cold weather embrittlement, specific gravity, and ASTM IZOD Impact, but that depending upon the percentage of reground rubber and process condition, the elongation, tensile module, and tensile break would be reduced, while the flex modulus would be higher.

TABLE 3

| Melt Temperature | 375° F. |
|---|---|
| Cold Weather Embrittlement | −80° F. |
| Elongation | 300-500% |
| Specific Gravity | 1.2 to 1.6 |
| Tensile Break | 3700 to 5700 psi |
| Tensile Modulus | 1100 to 2500 psi |
| Flex Modulus at 73° F. | 7000 to 7500 psi |
| ASTM IZOD* Impact - no break | ½ |

*Specimen units are foot pounds per inch of notch.

EXAMPLES 2–4

A series of mixtures of Kraton-D-3202 and high grade reground rubber were processed, generally according to the process described in conjunction with FIG. 3. A stable moldable end product was produced. Process conditions are set forth in Table 4. A 3½ inch extruder having a 24-inch barrel and a length to diameter ratio of 24:1 was used. Moisture was removed from the reground rubber prior to processing. The extruder in Examples 3 and 4 had a vacuum vent in the barrel near the die head to cool the barrel.

TABLE 4

| Example No. | Rubber/Kraton | Feed (lbs/hr.) | Temperature* | Pressure* |
|---|---|---|---|---|
| 2 | 50:50 | 200 | 411° F. | 1900 psi |
| 3 | 75:25 | 250 | 511° F. | 2800 psi |
| 4 | 75:25 | 250 | 492 | 3035 psi |

*These are approximate temperature and pressure at or near the die head.

EXAMPLE 5

A moldable product produced from a 75:25 mixture of Kraton-D-3202 and reground rubber was molded in a Van Doren 200 ton injection molding machine to produce a thread protector. The pressure was in the range of 1000 to 1500 psi, while the temperature was 360°–400° F. Testing of the thread protector has shown it to be of acceptable quality to date.

EXAMPLES 6–7

A high grade reground rubber with approximately the properties shown in Table 1 was fed under conditions of starve feeding to an extruder with Kraton-D-3202 in the ratios shown in Table 5. The extruder was a 3½ inch vented extruder with an underwater pelletizer having a ⅛th inch die coupled thereto. Conditions were also as specified in Table 5. In Examples 6 and 7 moldable product in pellet form having good conformation and being relatively homogeneous was obtained. The pellets appeared to comprise an aggregate which was well encapsulated by a skin or enclosure. The pellets produced in Example 6 had no porosity based on visual observations, while the pellets produced in Example 7 had some porosity based on visual observation.

TABLE 5

| Example No. | 6 | 7 |
|---|---|---|
| Ratio of Rubber/Kraton | 80:20 | 90:10 |
| Temperature ranges in extrusion zone | 340–380° F. | 360–400° F. |
| Temperature in pressure maintenance zone | 390° F. | 410° F. |
| Pressure in pressure maintenance zone | 1800 psi | 2100 psi |
| Residence time between feed zone and extruder head | 65 sec. | 75 sec. |
| Compression of screw | 4:1 | 4:1 |
| Length to Diameter ratio | 30:1 | 36:1 |

TABLE 5-continued

| Example No. | 6 | 7 |
|---|---|---|
| Number of mixing pins | 3 | 4 |
| Screw speed (rpm) | 180 | 200 |

EXAMPLES 8–9

The same materials and general process conditions were repeated as in Examples 6–7, respectively, except the extruder was not vented. No substantial change in the moldable product based on visual observation. This may have been due to the fact that the reground rubber was dried prior to feeding it to the extruder.

EXAMPLES 10–11

Process conditions were again generally repeated at the ratios of rubber to Kraton-D-3202 as in Examples 6–7, respectively. However, the materials in the extruder were kept under a nitrogen blanket. Again, no substantial change in the moldable product was noticed based on visual observations.

Although the foregoing examples as well as a large part of the foregoing discussion have been mainly directed to the use of the invention in connection with the extrusion and formation of a high grade reground rubber (i.e. one substantially or completely free of debris) and a butadiene styrene block copolymer, such as Kraton-D-3202, it should be understood that it is believed that the invention can also be used to advantage in conjunction with a variety of other materials. For example, another copolymer might be substituted in whole or in part for the butadiene-styrene block copolymer.

Depending upon the ratio of starting materials, the presence of other substances and process conditions a variety of products may be formed through use of the process. For example, a relatively hard and relatively non-porous elastomeric thread protector for use with oil field tubular goods may be produced by use of a 70:30 or 75:25 mixture of a high grade reground rubber and Kraton-D-3202 styrene-butadiene copolymer. Additionally, a rubber-like hose may be produced from a 70:30 mixture.

Further modifications and alternative embodiments of the inventive method and apparatus will be apparent to those skilled in the art having the benefit of this disclosure. Accordingly, this description and the examples are to be construed as illustrative and for the purpose of teaching those skilled in the art the manner of carrying out the invention according to the patent statute. For example, equivalent materials may be substituted for those specifically illustrated and described herein and certain features of the invention may be utilized independently of the use of other features. All this would be apparent to one skilled in the art after having the benefit of this description of the invention.

What is claimed is:

1. A process for forming a stable moldable product comprising:
    mixing a starting material comprising a high grade reground rubber and a cohesive base material in a ratio such that the starting material is comprised of at least 50% by weight of the reground rubber;
    placing the starting material under sufficient pressure and temperature for a sufficient residence time to plasticize a significant portion of the cohesive base material while avoiding significant degradation of the materials to form a semi-stable moldable product degradable under atmospheric pressure and having an aggregate interior portion at least partially encapsulated by an outer cover layer; and
    maintaining the semi-stable moldable product under a sufficiently high pressure while at least partially cooling the semi-stable moldable product to allow the outer cover layer to strengthen and form a stable moldable product, said stable moldable product being able to form a molded product having reduced porosity and generally uniform properties.

2. A process according to claim 1 wherein the starting material is comprised of at least 70% by weight of the reground rubber.

3. A process according to claim 1 wherein the cohesive base material comprises a thermoplastic polymer.

4. A process according to claim 3 wherein the thermoplastic polymer comprises a thermoplastic rubber.

5. A process according to claim 1 wherein the pressure on the semi-stable moldable product is at least about 1100 psig.

6. A process according to claim 1 wherein the pressure on the semi-stable moldable product is at least about 1800 psig.

7. A process according to claim 1 wherein the step of mixing the materials is done in a screw extruder having a feed section, a pump section and a metering section, each section comprising a plurality of flights.

8. A process according to claim 1 further comprising molding of the stable moldable end product to form a molded product comprising the steps of:
    heating the stable moldable product sufficiently to form a plasticized moldable material while under sufficient pressure to avoid significant deterioration of the plasticized moldable material;
    injecting the plasticized moldable material into a mold at a sufficiently high velocity to avoid significant localized cooling;
    subsequently at least partially cooling the plasticized moldable material in the mold while maintaining pressure on the material sufficient to avoid significant deterioration of the material; and
    further cooling the material to the extent required to form a relatively nonporous molded product having generally uniform properties.

9. A process according to claim 8 wherein the step of cooling the plasticized moldable material in the mold occurs by placing a liquid cooling medium in heat exchange relation with the plasticized moldable material, the cooling medium being in a temperature range of about 65° to 80° F.

10. A process according to claim 9 wherein the molding fill velocity is greater than about three inches per second.

11. A process for forming a stable moldable product comprising:
    feeding a high grade reground rubber and a cohesive base material in predetermined quantities without substantially premixing to a feed zone for mixing to form a uniformly distributed mixture comprising at least 50% by weight of the reground rubber;
    compressing and heating the mixture for a sufficient time to form a plastic stream;
    passing the plastic stream under sufficient temperature and pressure through a metering zone until a semi-stable moldable product is formed;
    maintaining the semi-stable product under a sufficiently high pressure while at least partially cooling the semi-stable moldable product to form a stable product, said stable product being able to form a molded product having relatively low porosity and generally uniform properties.

12. A process according to claim 11 wherein the mixture comprises at least 70% by weight of the reground rubber.

13. A process according to claim 11 wherein the pressure on the semi-stable product is at least about 1,100 psig.

14. A process according to claim 11 wherein the reground rubber is a high grade reground rubber obtained from tire peels.

15. A process according to claim 11 wherein the cohesive base material comprises a thermoplastic rubber.

16. A process for forming a stable moldable product comprising:

feeding a high grade reground rubber material and a thermoplastic rubber material comprising a styrene-butadiene block copolymer to a feeding zone to form a uniformly distributed mixture comprising at least 70% by weight of reground rubber, while applying heat to the materials as the materials are fed and mixed;

compressing the mixture at a pressure in the range of 1,100 to 1,800 psig or higher while heating the mixture to a temperature in the range of 350°–500° F. for a sufficient time to form a semi-stable moldable product; and maintaining the semi-stable moldable product under a pressure in excess of about 1,800 psig while partially cooling the semi-stable moldable product for at least one-half of its cooling cycle to form a stable moldable product said stable moldable product being able to form a molded product having reduced porosity and generally uniform properties.

* * * * *